Figure 1:
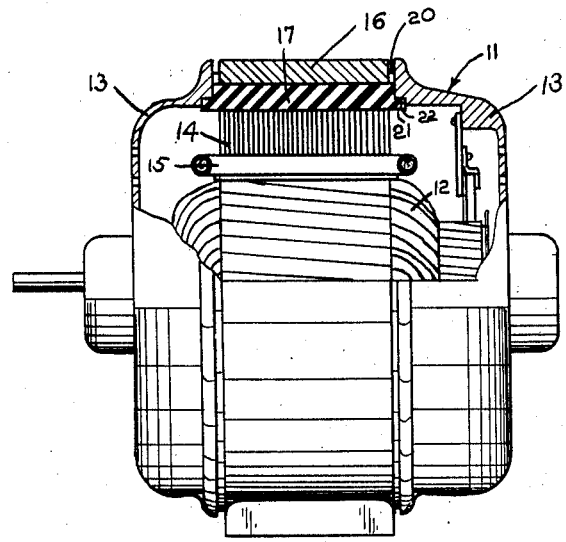

Oct. 23, 1928.

1,688,891

C. C. SPREEN

ELECTRIC MOTOR

Filed Jan. 10, 1927

Charles C. Spreen
Inventor by Smith and Freeman
Attorneys

Patented Oct. 23, 1928.

1,688,891

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

ELECTRIC MOTOR.

Application filed January 10, 1927. Serial No. 160,294.

Figure 2:
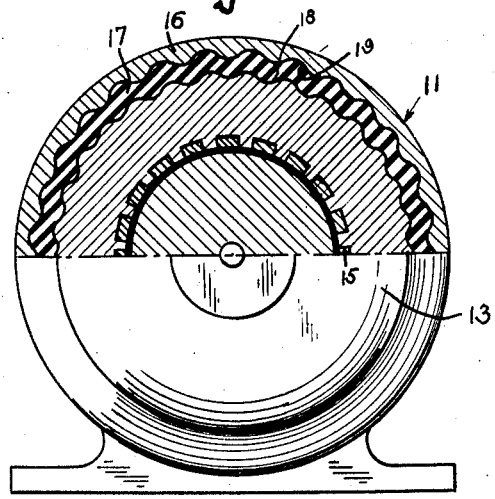

My invention relates to electric motors, and particularly to means for forming the compressor operating motor of a domestic mechanical refrigeration unit to decrease the vibration of such motor, and the noise produced by such vibration, and the principal object of my invention is to provide new and improved means of this type. In the drawings accompanying this specification and forming a part of this application I have shown, for purposes of illustration, one form which my invention may assume, and in these drawings:

Figure 1 is a side elevation partly broken away showing the embodiment of my invention herein disclosed, while Figure 2 is a transverse section on the line 2—2 of Figure 1.

The embodiment of my invention comprises an electric motor 11 comprising a rotor 12 rotatably mounted in end plates 13, a stator 14 carrying stator windings 15, a frame 16, and an annular soft rubber member 17 disposed between the outer surfaces of the stator 14 and the inner surface of the frame 16 corrugated to cooperate with the corrugations 18 on the outer surface of the stator 14 and the corrugations 19 on the inner surface of the frame 16, provided with flanges 20 disposing the member 17 also between the stator 14 and frame 16 and the end plates 13, and provided further with annular shoulders 21 entering annular recesses 22 in the end plates 13 and effective to hold the end plates 13 and rotor 12 centered relative to the stator 14 and frame 16.

From the above description it will be obvious to those skilled in the art that in the embodiment of my invention the stator is insulated from the motor frame, and therefore from any motor support, by means of material effective to absorb at least a large part of the vibration of the motor, and therefore effective to eliminate at least a large part of the noise resulting from such vibration.

Under these circumstances it will be obvious to those skilled in the art that the embodiment of my invention herein shown and described accomplishes at least the principal object of my invention.

At the same time it will also be obvious to those skilled in the art that the particular embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. A vibration reducing construction for an electric motor comprising a motor frame, a motor stator, and intermediate resilient means interposed between said stator and said frame and supporting said stator in said frame held only resiliently against both rotary and translatory movements relative to said frame.

2. A vibration reducing construction for an electric motor comprising a motor frame having a corrugated inner supporting surface, a motor stator having an outer surface cooperatingly waved, and an intermediate annular resilient band corrugated to cooperate with said surfaces and interposed between said stator and said frame and supporting said stator in said frame held only resiliently against both rotary and translatory movements relative to said frame.

3. A vibration reducing construction for an electric motor comprising a motor frame, a motor stator, and an intermediate annular rubber band interposed between said stator and said frame and supporting said stator in said frame held only resiliently against both rotary and translatory movements relative to said frame.

In testimony whereof I hereunto affix my signature.

CHARLES C. SPREEN.